(12) United States Patent
Gresley et al.

(10) Patent No.: US 8,181,763 B2
(45) Date of Patent: May 22, 2012

(54) WINDOW WINDER DRIVE

(75) Inventors: Ross A. Gresley, Tega Cay, SC (US); Thomas C. Catrett, Robertsdale, AL (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 870 days.

(21) Appl. No.: 12/162,651

(22) PCT Filed: Dec. 8, 2006

(86) PCT No.: PCT/EP2006/069502
§ 371 (c)(1),
(2), (4) Date: Jul. 30, 2008

(87) PCT Pub. No.: WO2007/087927
PCT Pub. Date: Aug. 9, 2007

(65) Prior Publication Data
US 2009/0000902 A1 Jan. 1, 2009

Related U.S. Application Data

(60) Provisional application No. 60/764,065, filed on Jan. 31, 2006.

(51) Int. Cl.
*E05F 15/00* (2006.01)
*F16D 51/00* (2006.01)

(52) U.S. Cl. ...................................... 192/223.2; 49/349
(58) Field of Classification Search ................ 192/223.2
See application file for complete search history.

(56) References Cited

U.S. PATENT DOCUMENTS

| 5,896,973 A | * | 4/1999 | Hochmuth et al. | ......... 192/223.2 |
| 5,947,254 A | * | 9/1999 | Jones | .......................... 192/223.2 |
| 6,288,464 B1 | | 9/2001 | Torii et al. | |
| 6,695,118 B2 | * | 2/2004 | Kurita et al. | ............... 192/223.2 |
| 2001/0047916 A1 | | 12/2001 | Kudou | |
| 2004/0212260 A1 | | 10/2004 | Aoki | |
| 2004/0216981 A1 | | 11/2004 | Acosta | |

* cited by examiner

*Primary Examiner* — Rodney Bonck
(74) *Attorney, Agent, or Firm* — Lucas & Mercanti, LLP; Klaus P. Stoffel

(57) ABSTRACT

A window winder drive functions with a freewheeling coupling, which has an outer coupling part and an inner coupling part, which is concentric thereto, and comprises clamping bodies arranged between a clamping face of the outer coupling part and a clamping face of the inner coupling part, wherein the clamping bodies are arranged in pairs in the annular space formed between the clamping faces, and the first clamping body of a pair of clamping bodies demonstrates a clamping effect exclusively in a specific direction of rotation of the outer coupling part in relation to the inner coupling part, while the second clamping body of the pair of clamping bodies exclusively has a clamping effect in the opposite direction of rotation.

6 Claims, 4 Drawing Sheets

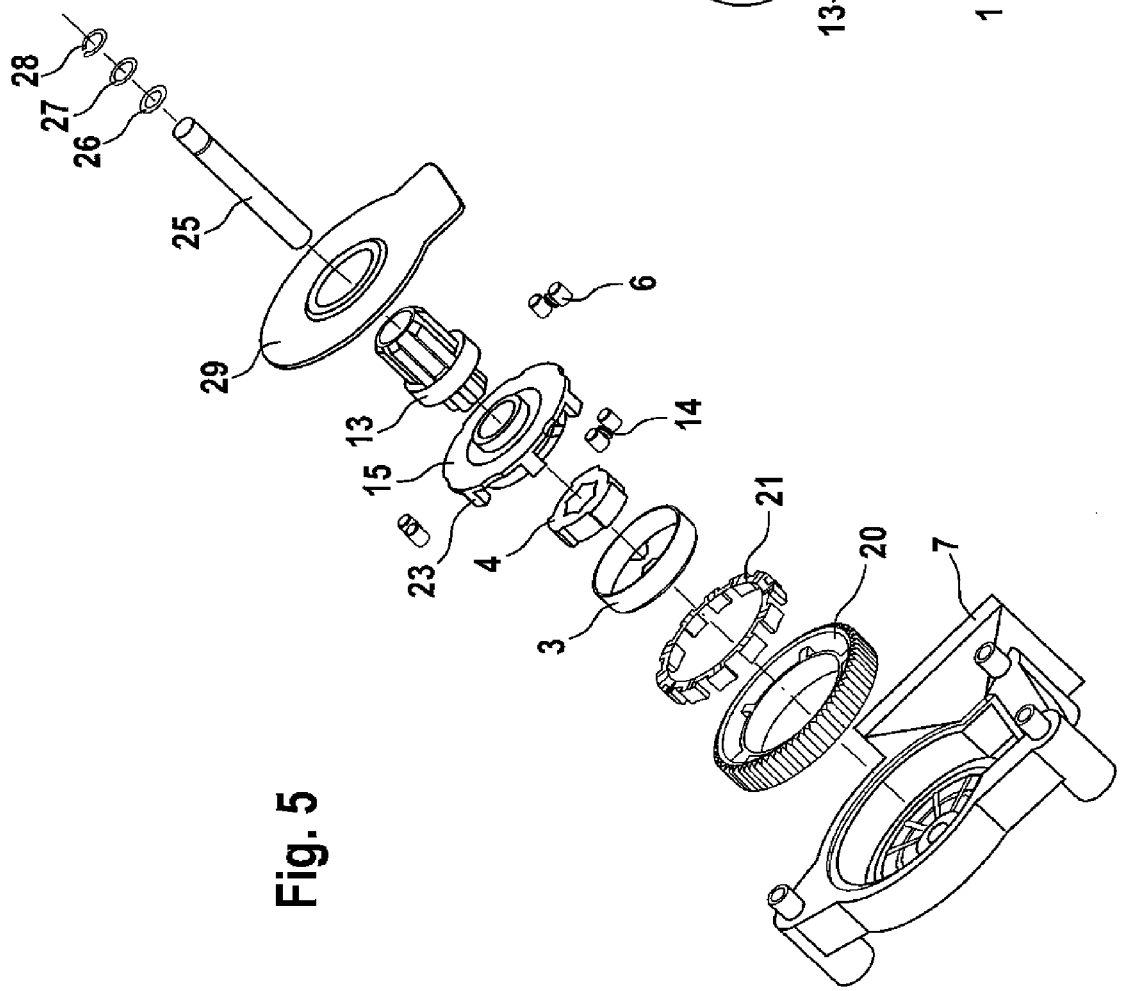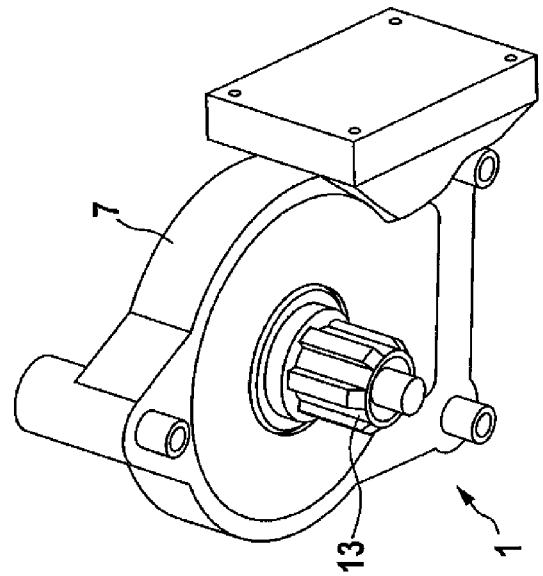

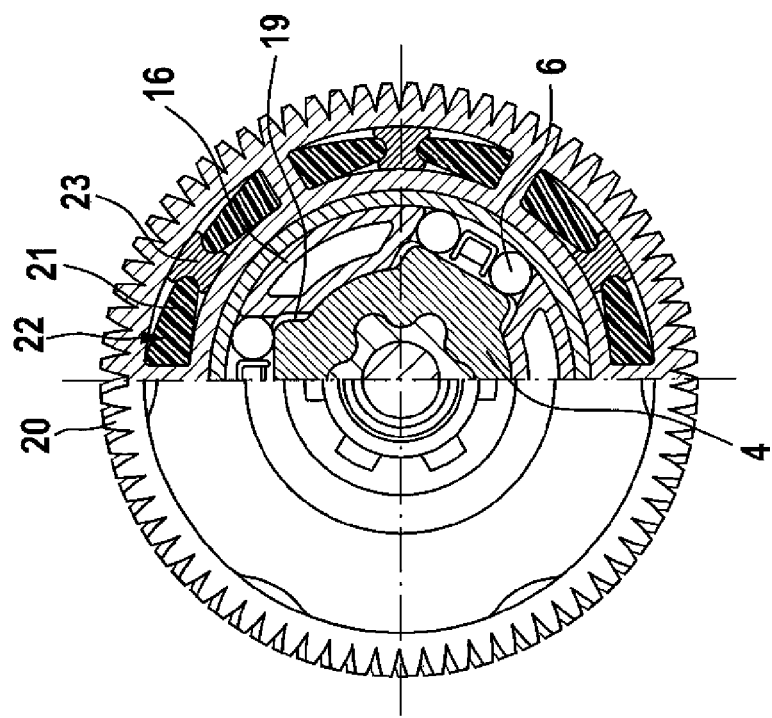
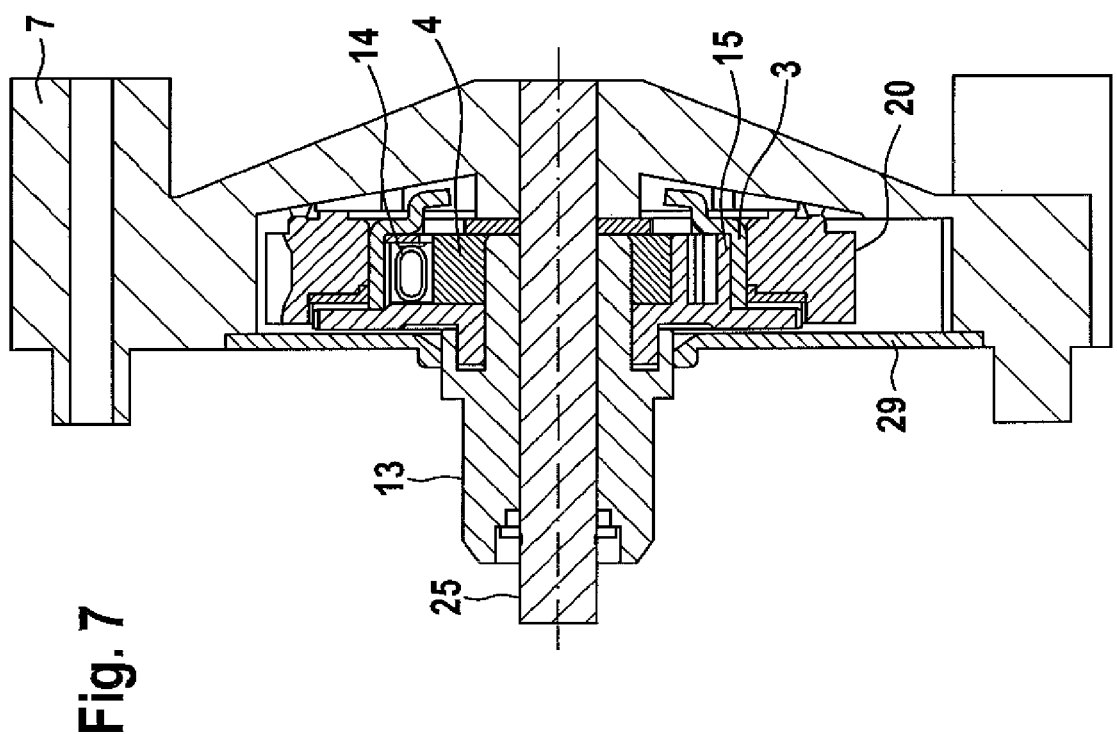

WINDOW WINDER DRIVE

FIELD OF THE INVENTION

The invention relates to a window winder drive which is suitable for a motor vehicle and comprises a freewheeling clutch.

BACKGROUND OF THE INVENTION

A window winder drive according to the preamble of claim 1 is known, for example, from U.S. Pat. No. 6,288,464 B1. A freewheeling clutch of said window winder drive has an outer clutch part and an inner clutch part concentric with respect thereto, wherein each clutch part forms a clamping surface for clamping bodies arranged between the clutch parts. The known window winder drive furthermore has a worm gear, the input shaft of which is driven by motor via the freewheeling clutch. The freewheeling clutch is arranged on the end side of the electric motor provided for the drive and shares a part with the electric motor.

OBJECT OF THE INVENTION

The invention is based on the object of providing a window winder drive with a freewheeling function, said drive being distinguished by a particularly compact construction with unlimited functionality.

SUMMARY OF THE INVENTION

This object is achieved according to the invention by a window winder drive with the features of claim 1. Said window winder drive, which can be installed in particular in a door of a motor vehicle, comprises a freewheeling clutch with an outer clutch part having an inner clamping surface and an inner clutch part which is arranged concentrically and rotatably relative to said outer clutch part and which likewise has at least one clamping surface. A plurality of clamping bodies, in particular clamping rollers, are arranged in pairs in the annular space formed between the clamping surfaces of the various clutch parts. In this case, one of the clamping bodies is provided exclusively for clamping the inner clutch part relative to the outer clutch part in a first direction of rotation while the second clamping body exclusively has a clamping action in the opposite direction of rotation. This has the advantage that both clamping bodies can be kept permanently ready for clamping, thus permitting a play-free design of the freewheeling clutch. An additional self-locking drive device, for example a worm gear, of the window winder drive is not required. Similarly, there are no restrictions with regard to the design and the transmission ratio of gears present, if appropriate, in the window winder drive.

According to a first refinement, the clamping surface formed on the outer contour of the inner clutch part is cylindrical while the clamping surface of the outer clutch part is in the form of clamping ramps. According to a second refinement, the outer clutch part has a smooth, cylindrical clamping surface while clamping ramps are formed on the circumference of the inner clamping part. In this refinement, the clamping ramps are arranged in the form of "plateaus", a plateau being formed from two clamping ramps which are inclined in opposite directions relative to the cylindrical clamping surface of the outer clutch part and therefore, in interaction with a respective clamping body, ensure a freewheeling function in opposite directions of rotation. A compression spring is preferably clamped between the clamping bodies arranged on the plateau in order to permanently maintain the play-free state of being ready for clamping.

The output part of the freewheeling clutch can in principle be provided by the outer clutch part or by the inner clutch part. In the case of a cylindrical design of the clamping surface of the outer clutch part, the inner clutch part preferably acts as the output part of the freewheeling clutch. In advantageous refinement, claws of a switching cage engage in the annular space between the clutch parts, said claws being suitable to force clamping bodies out of their clamping position and to rotate the inner clutch part relative to the outer clutch part. The switching cage, which acts as a drive part, is preferably formed for direct interaction with the inner clutch part. In this case, stops of the claws of the switching cage engage on flanks of the inner clutch part, with the flanks being formed by the contour of the plateaus of the inner clutch part.

According to one development, a damping element is connected between the switching cage and a drive element, which can be driven in particular by electric motor. Said damping element or a multi-part damping device can be arranged in a particularly space-saving manner concentrically with respect to the clutch parts and at least partially in that axial construction space behind which the clutch parts are located. A cavity of the drive element, which cavity is in particular annular or annular in sections and in which at least one outer claw of the switching cage engages, is suitable for the arrangement of the damping element. In this case, the outer claw of the switching cage is connected in a rotationally fixed manner to the inner claws of the switching cage, which claws engage in the annular space between the clutch part.

Two exemplary embodiments of the invention are explained in more detail below with reference to a drawing:

BRIEF DESCRIPTION OF THE DRAWING

FIGS. 3 to 8 show a second exemplary embodiment of a window winder drive with a freewheeling clutch.

DETAILED DESCRIPTION OF THE DRAWING

Parts which correspond to one another or act in an identical manner are provided with the same reference numbers in both exemplary embodiments.

Figure 1:
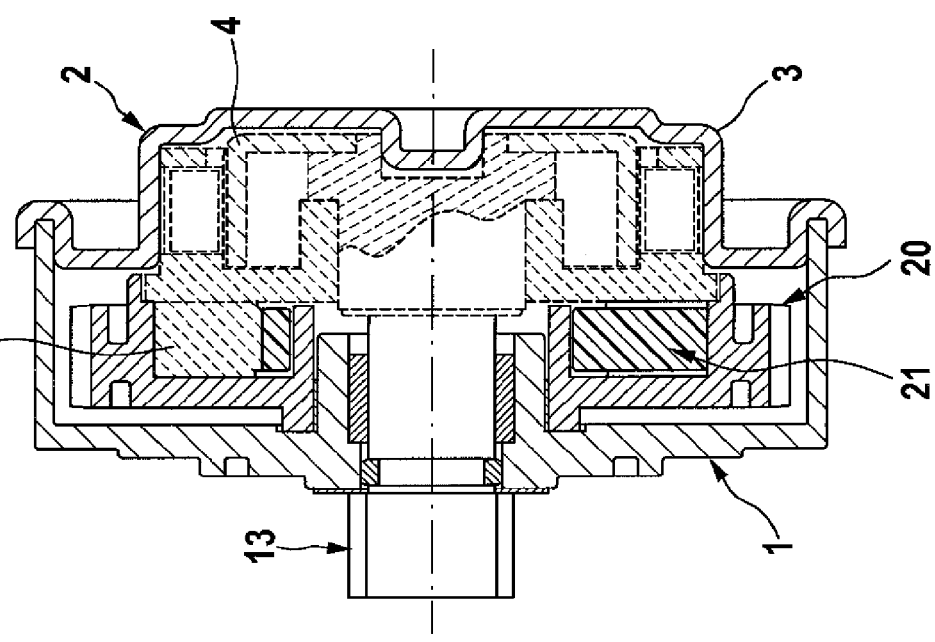
FIGS. 1 and 2 show a first exemplary embodiment of a window winder drive with a freewheeling clutch.
Figure 2:
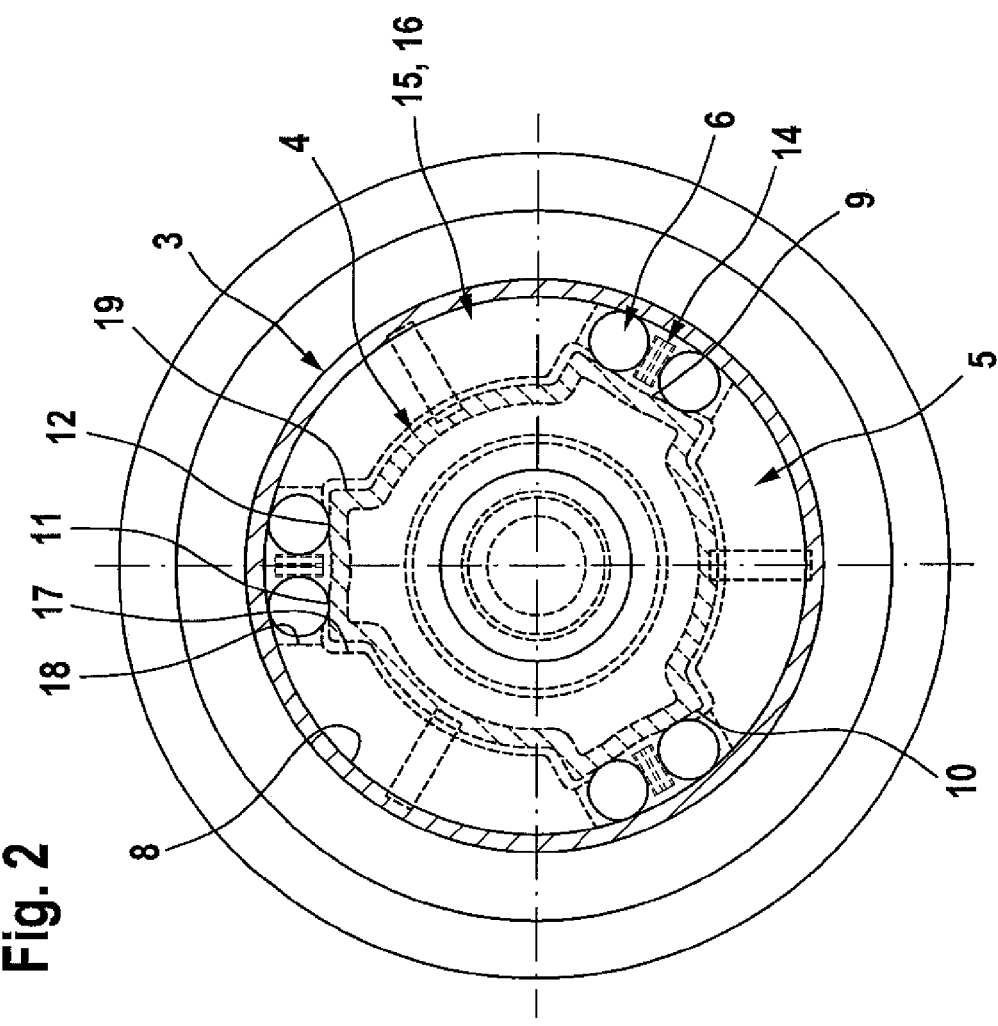
Figure 3:
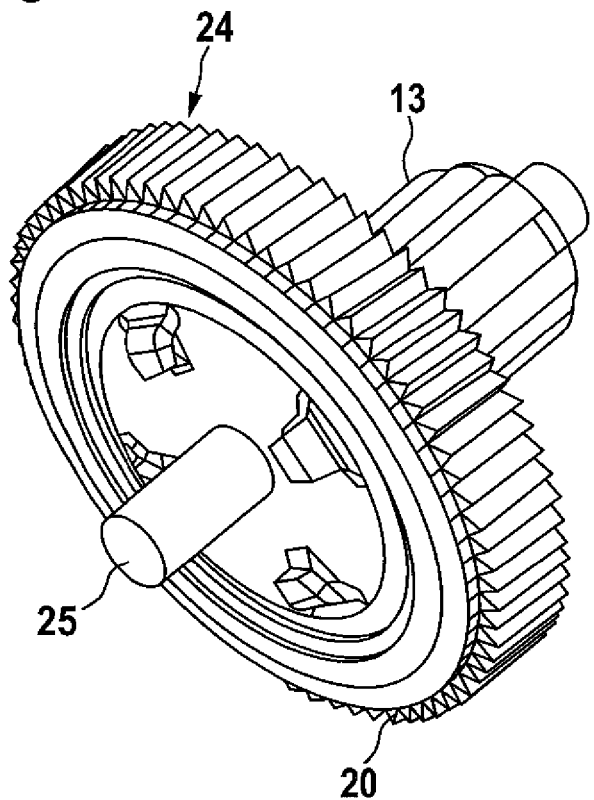
Figure 4:
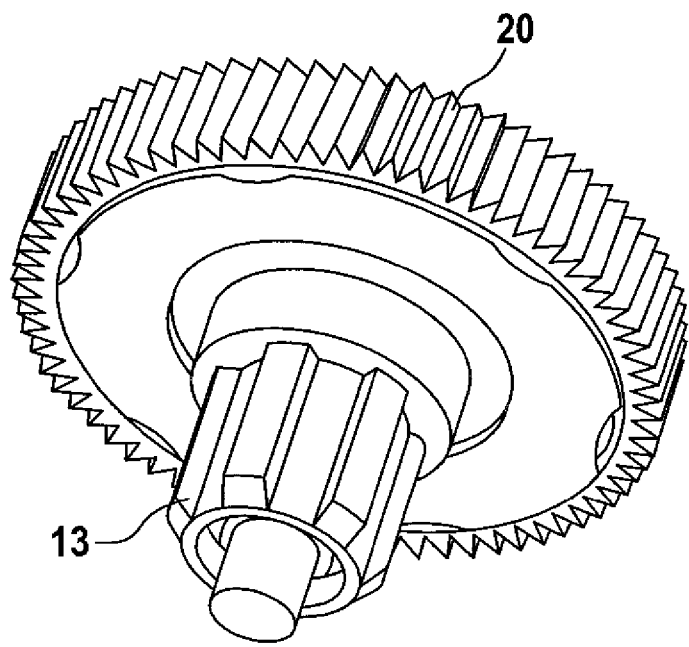

FIGS. 1 and 2 show, in different sections, parts of a window winder drive 1 with a freewheeling clutch 2 which is designed as a freewheeling clutch which can be switched in two directions. An annular space 5 in which clamping bodies 6, namely clamping rollers, are arranged is formed between an outer clutch part 3 and an inner clutch part 4, which is arranged concentrically with respect thereto, of the freewheeling clutch 2. While the outer clutch part 3 has a cylindrical inner clamping surface 8, the inner clutch part 4 is designed in the form of an inner star. Outer clamping surfaces 9 are located on plateaus 10 on the circumference of the inner clutch part 4. Each of the total of three plateaus 10 of the inner clutch part 4 is composed of in each case two clamping ramps 11, 12 which are inclined in the opposite direction relative to the clamping surface 8 of the outer clutch part 3. A clamping body 6 is located on each of the clamping ramps 11, 12 such that the clamping bodies 6 are arranged in pairs on the plateaus 10.

In the arrangement according to FIG. 2, the clamping body 6 arranged on the clamping ramp 11 prevents rotation of the inner clutch part 4 in the clockwise direction while the clamping body 6 arranged on the clamping ramp 12 deploys a clamping action when the inner clutch part 4 is subjected to a torque in the opposite direction. Rotation of the outer clutch part 3 in the window winder drive 1 is not provided.

The inner clutch part 4 is connected in a rotationally fixed manner to an output shaft 13 which is coupled to a gear (not illustrated) which makes it possible to displace a vehicle window. If a torque is introduced via the output shaft 13 into the inner clutch part 4, then the latter remains blocked in each direction of rotation by means of the clamping bodies 6. In order to ensure that the freewheeling clutch 2, which can be switched in two directions, is continuously ready for clamping, a compression spring 14 is clamped in each case between two clamping bodies 6 arranged on a plateau 10.

A drive of the inner clutch part 4 is possible exclusively by means of a switching cage 15 which has a plurality of claws 16 engaging in the annular space 5. The claws 16 are essentially located in the circumferential regions of the annular space 5 between the plateaus 10. Each claw 16 is delimited in the circumferential direction, in a region adjacent to a plateau 10, by a radially inner contact surface 17 and by a radially outer contact surface 18. In this case, the outer contact surface 18 is provided for interaction with a clamping body 6 while the inner contact surface 17 of the claw 16 permits direct interaction of the switching cage 15 with the inner clutch part 4. The inner contact surface 17 is provided here for making contact with a flank 19, which delimits a plateau 10, of the inner clutch part 4. In the arrangement according to FIG. 2, that is to say in the blocked position of the freewheeling clutch 2, the outer contact surface 18 is spaced apart in the circumferential direction from the adjacent clamping body 6 to a somewhat lesser extent than the inner contact surface 17 is from the flank 19. This has the result that, when the switching cage 15 is pivoted, first of all the clamping body 6 is forced out of the clamping position and subsequently the inner clutch part 4 is rotated together with the switching cage 15. The switching cage 15 is actuated by means of a drive element 20, namely a drive gearwheel, which is driven by an electric motor, with a damping element 21 being connected between the drive element 20 and the switching cage 15. The damping element 21 which is designed as an elastic clutch is located radially approximately in the same construction space in which the clamping bodies 6 and the claws 16 are also arranged. In the axial direction of the freewheeling clutch 2, the damping element 21, which is manufactured from an elastomer, for example polyurethane, is spaced apart from the clamping body 6. If the damping element 21 is omitted, the drive element 20 may also be connected in a rotationally fixed manner to the switching cage 15.

The exemplary embodiment according to FIGS. 3 to 8 differs from the exemplary embodiment according to FIGS. 1 and 2 primarily by means of the arrangement of the damping element 21 and of the drive element 20 relative to the clutch parts 3, 4. Sections of an overall annular cavity 22 in which subsections or individual pieces of the damping element 21 are arranged are located in the drive element 20. In addition, outer claws 23 of the switching cage 15 engage in the cavity 22 such that a torsional vibration damping between the drive element 20 and the switching cage 15 is realized. The drive element 20, including a toothing 24, and the damping element 21 are arranged within a housing 7, which is covered by a cover 29, in a particularly space-saving manner in the same axial construction space in which the clutch parts 3, 4 are also located. The housing 7 and the output shaft 13 are penetrated by a full floating axle 25, with an O-ring 26, a sealing ring 27 and a spring ring 28 being arranged between the full floating axle 25 and the output shaft 13.

List Of Reference Numbers

1 Window winder drive
2 Freewheeling clutch
3 Outer clutch part
4 Inner clutch part
5 Annular space
6 Clamping body
7 Housing
8 Clamping surface
9 Clamping surface
10 Plateau
11 Clamping ramp
12 Clamping ramp
13 Output shaft
14 Compression spring
15 Switching cage
16 Claw
17 Contact surface
18 Contact surface
19 Flank
20 Drive element
21 Damping element
22 Cavity
23 Claw
24 Toothing
25 Full floating axle
26 O-ring
27 Sealing ring
28 Spring ring
29 Cover

The invention claimed is:
1. A window winder drive, comprising:
a freewheeling clutch having an outer clutch part with a first clamping surface, an inner clutch part with a second clamping surface concentric with respect to the outer clutch part and clamping bodies arranged between the first clamping surface of the outer clutch part and the second clamping surface of the inner clutch part;
a switching cage having claws which engage in an annular space and force the clamping bodies out of a clamping position to rotate the inner clutch part relative to the outer clutch part;
a drive element; and
a damping element which is connected between the drive element and the switching cage,
wherein the clamping bodies are arranged in pairs in the annular space formed between the clamping surfaces, each pair includes a first clamping body having a clamping action exclusively in a first direction of rotation of the outer clutch part relative to the inner clutch part, and a second clamping body having a clamping action exclusively in second direction of rotation, opposite the first direction of rotation.

2. The window winder drive as claimed in claim 1, wherein the inner clutch part has a circumference with a plateau formed on the circumference and the plateau has clamping ramps which are inclined in opposite directions and on each of the clamping ramps one of the clamping bodies is arranged.

3. The window winder drive as claimed in claim 2, further comprising a compression spring, which keeps the clamping bodies ready for clamping, clamped between said clamping bodies which are arranged on the clamping ramps.

4. The window winder drive as claimed in claim 2, wherein the inner clutch part has flanks that delimit the plateau and the switching cage has contact surfaces which interact with the flanks.

5. The window winder drive as claimed in claim 1, wherein the damping element is arranged concentrically with respect to the clutch parts and in a same axial construction space.

6. The window winder drive as claimed in claim 1, wherein the switching cage has an outer claw and the damping element is arranged in a cavity of the drive element with the outer claw of the switching cage engaging into the cavity.

* * * * *